US008242412B2

(12) United States Patent
Liu et al.

(10) Patent No.: US 8,242,412 B2
(45) Date of Patent: Aug. 14, 2012

(54) HEATED KEYBOARD

(75) Inventors: Lei Liu, Shenzhen (CN); Xiao-Feng Ma, Shenzhen (CN)

(73) Assignees: Hong Fu Jin Precision Industry (ShenZhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 547 days.

(21) Appl. No.: 12/548,449

(22) Filed: Aug. 27, 2009

(65) Prior Publication Data
US 2011/0036824 A1    Feb. 17, 2011

(30) Foreign Application Priority Data
Aug. 17, 2009  (CN) .............................. 200910305691

(51) Int. Cl.
*H05B 3/00*  (2006.01)
(52) U.S. Cl. ......... 219/209; 219/200; 219/522; 219/549
(58) Field of Classification Search ................. 219/200, 219/209, 522, 549
See application file for complete search history.

(56) References Cited

U.S. PATENT DOCUMENTS
6,646,226 B1 * 11/2003 Reitz ............................ 219/209
* cited by examiner

*Primary Examiner* — Long Pham
(74) *Attorney, Agent, or Firm* — Altis Law Group, Inc.

(57) ABSTRACT

A heated keyboard includes a number of input keys and a circuit board. A heating member is arranged in each of the number of input keys connected to voltage pin of the circuit board via a heating switch. When the heating switch is turned on, the heating member receives a voltage signal from the circuit board, thereby the heating member generates heat for warming user's hand.

5 Claims, 4 Drawing Sheets

HEATED KEYBOARD

BACKGROUND

1. Technical Field

The present disclosure relates to keyboards and, particularly, to a heated keyboard which can generate heat for warming keyboard users.

2. Description of Related Art

Many keyboard users spend several hours per day using keyboards in workplace. When the users operate the keyboards under low temperatures, the users' hands may become cold and numb, thus lowering the work efficiency.

DETAILED DESCRIPTION

Figure 1:
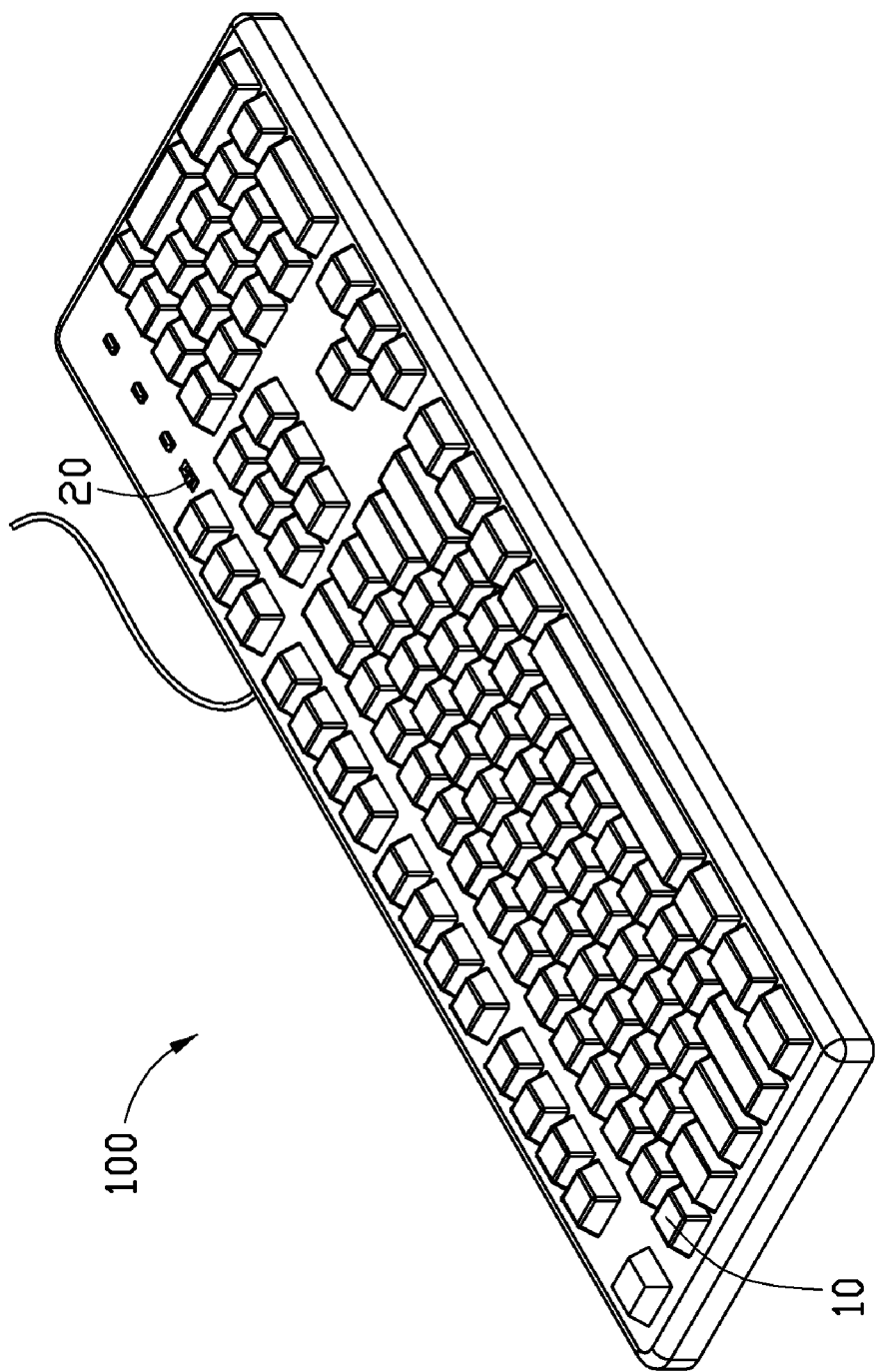
FIG. 1 is a schematic view of an exemplary embodiment of a heated keyboard includes a plurality of input keys.
Figure 2:
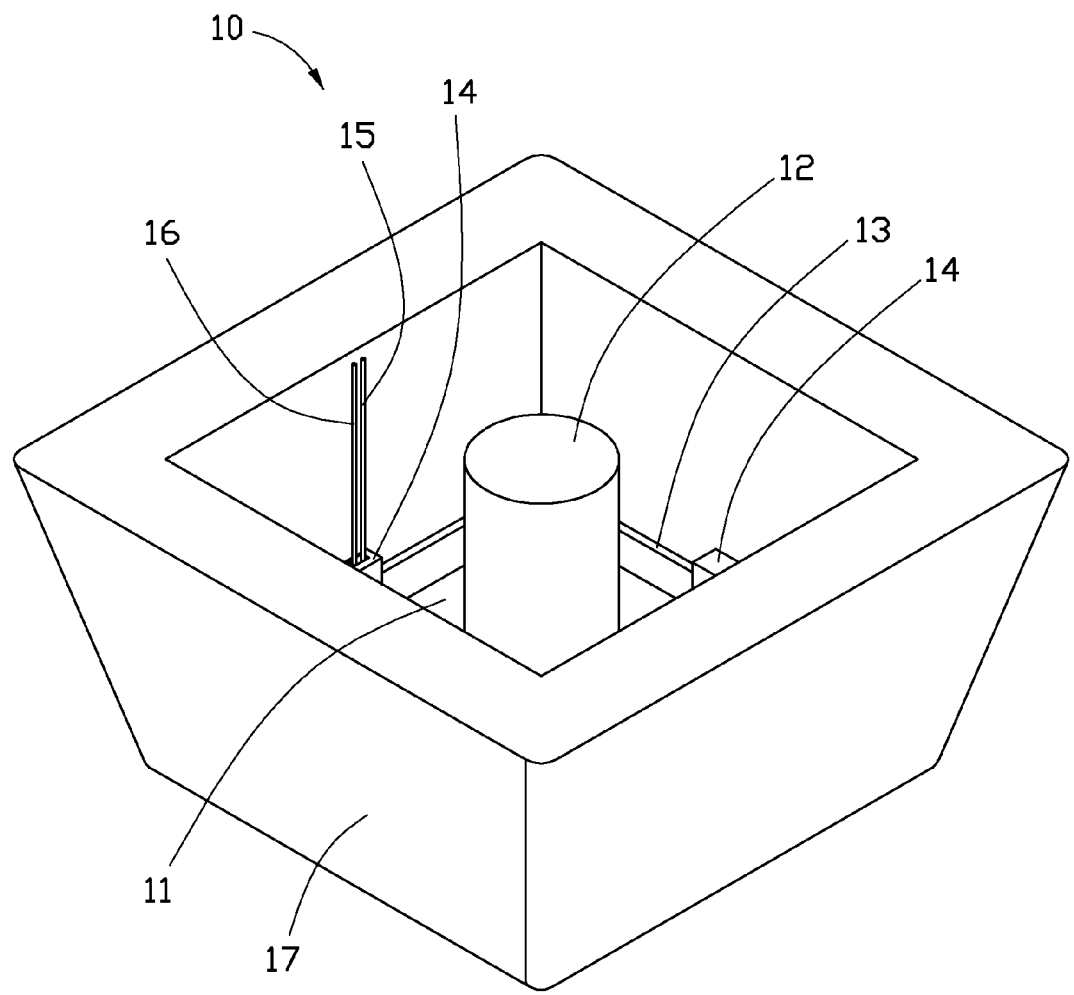
FIG. 2 is an isometric view of a input key of the heated keyboard of FIG. 1.
Figure 3:
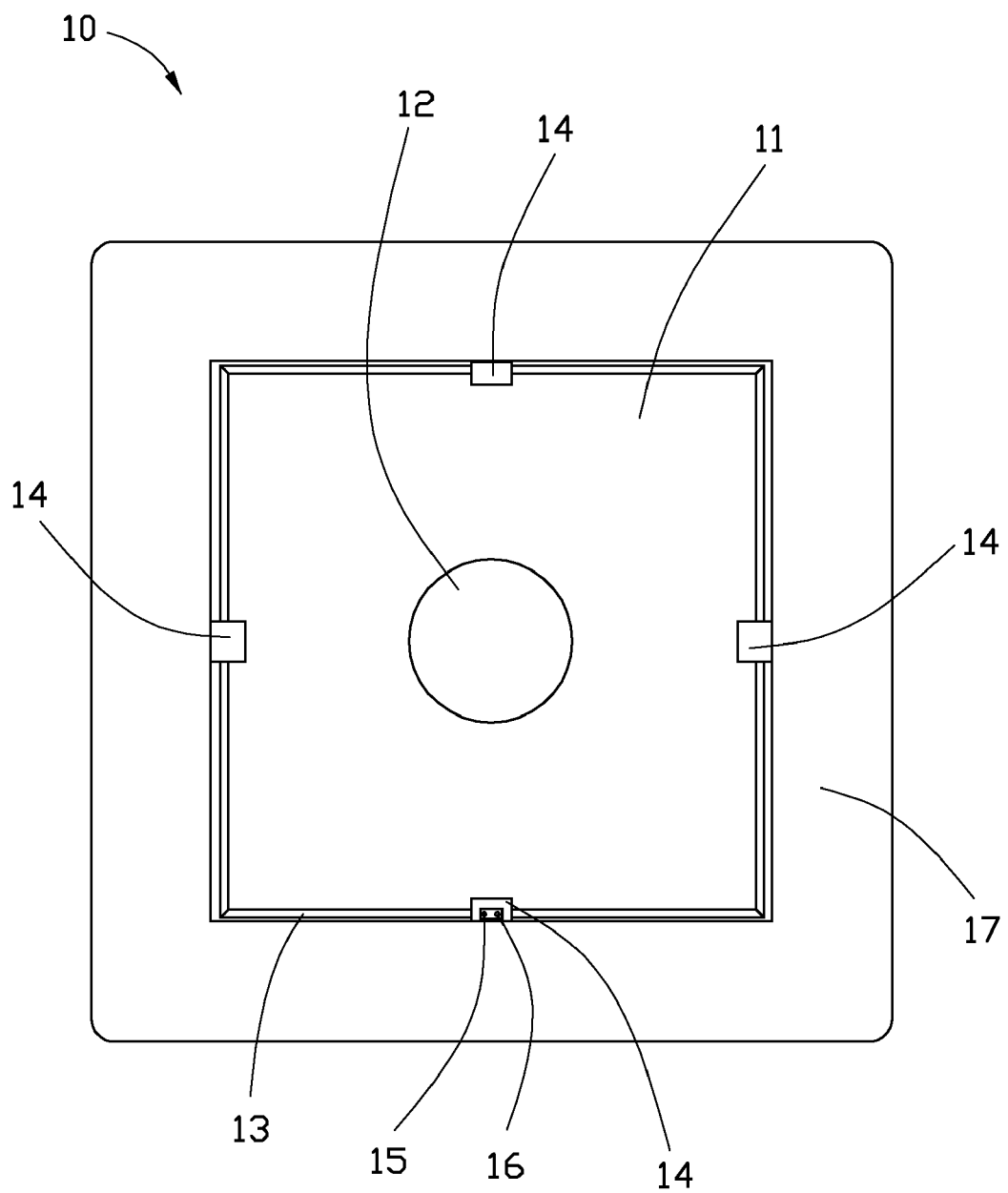
FIG. 3 is a top plan view of the input key of FIG. 2.
Figure 4:
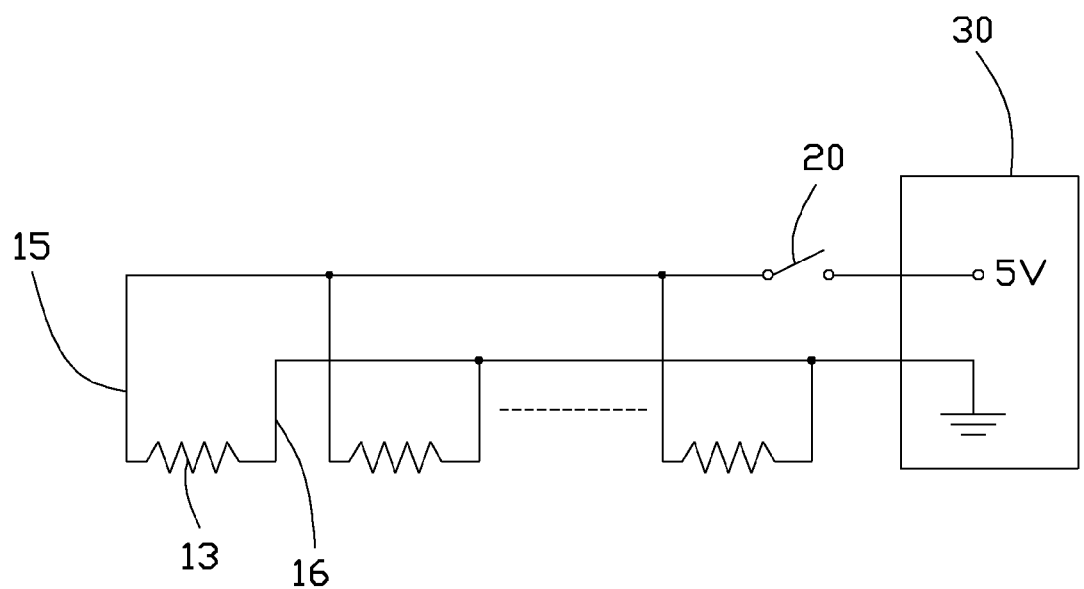
FIG. 4 is a partial circuit diagram of the heated keyboard of FIG. 1.

Referring to FIGS. 1 to 4, an exemplary embodiment of a heated keyboard 100 includes a plurality of input keys 10, a heating switch 20 arranged thereon, and a circuit board 30 arranged therein.

Each of the input keys 10 includes a top wall 11, four peripheral walls 17 extending down from the top wall 11, and a key column 12 extended from the top wall for executing key-press operation. A heating member 13 is mounted on inner surfaces of the four peripheral walls 17 of the input keys 10 via four supporting brackets 14 fixed on the four peripheral walls 17 of the input keys 10. The heating member 13 can be located adjacent to the top wall 11 or on the inner surface of the top wall 11. Two terminals of the heating member 13 are electrically connected to a power line 15 and a ground line 16 correspondingly, via one of the four supporting bracket 14. The power line 15 is connected to a 5 volts (V) voltage pin of the circuit board 30 via the heating switch 20. The ground line 16 is connected to a ground pin of the circuit board 30.

In one embodiment, all of the plurality of input keys 10 include the heating member 13 arranged therein. In other embodiments, the heating members 13 may be exclusively arranged in a predetermined subset of the input keys 10, for example, the heating members 13 may be only arranged in the bottom two rows of the input keys 10.

In use, when the heating switch 20 is turned on, the heating member 13 arranged in each of the input keys 10 receives a voltage signal from the 5V voltage pin of the circuit board 30, thereby the heating member 13 generates heat and warming the input key 10, and as a result, also warming user's hand. Because the heating member 13 is arranged adjacent to the top wall of the input key 10, and away from the circuit board 30 which is located at bottom portion of the keyboard 100, the heat from the heating members 13 will warm the user's hand without affecting the circuit board 30. Preferably, a heat insulation sheet can be placed between the heating member 13 and the circuit board 30.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A heated keyboard, comprising:
   a plurality of input keys, wherein a heating member is arranged in at least one of the plurality of input keys;
   a circuit board arranged therein; and
   a heating switch mounted on the keyboard, wherein a first terminal of the heating member of each of the at least one input key is electrically connected to a voltage pin of the circuit board via the heating switch, a second terminal of the heating member of each of the at least one input key is electrically connected to a ground pin of the circuit board.

2. The heated keyboard of claim 1, wherein the heating member is mounted on four peripheral walls of each of the at least one input key.

3. The heated keyboard of claim 2, wherein a bracket is fixed on the four peripheral walls of each of the at least one input key to mount the heating member thereon.

4. The heated keyboard of claim 3, wherein the two terminals of each heating member are electrically connected to a power line and a ground line, via one of the supporting brackets, the power line is connected between the heating member and the heating switch, the ground line is connected between the heating member and the ground pin of the circuit board.

5. The heated keyboard of claim 4, wherein a heating member is arranged in each of the plurality of input keys.

\* \* \* \* \*